Nov. 4, 1941.    R. D. BALLARD    2,261,823
ROLLER SKATE WHEEL OR CASTER
Filed April 15, 1940
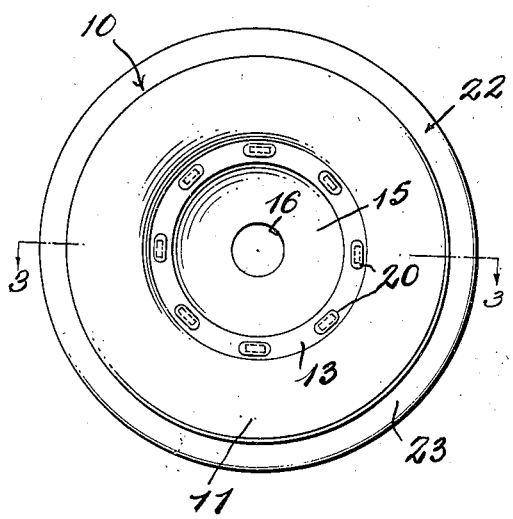
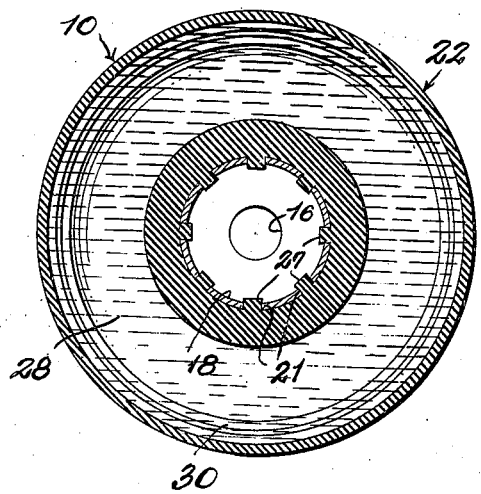
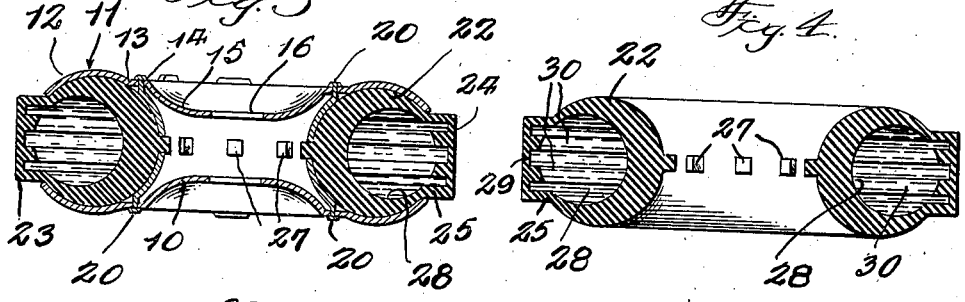
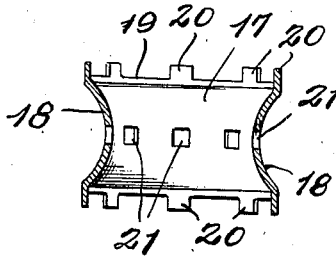
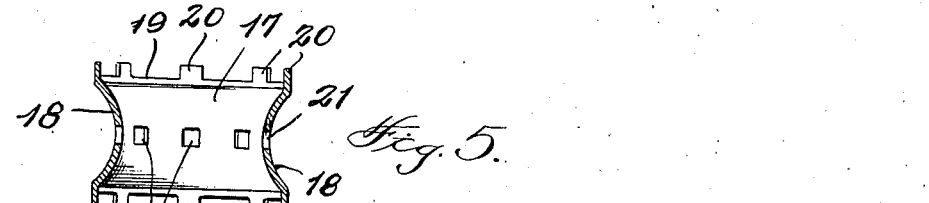
Inventor
Robley Danglison Ballard,
By Christian R. Nielsen
Attorney Patented Nov. 4, 1941

2,261,823

UNITED STATES PATENT OFFICE 2,261,823

ROLLER SKATE WHEEL OR CASTER

Robley Dunglison Ballard, Seville, Ohio

Application April 15, 1940, Serial No. 329,801

3 Claims. (Cl. 301—5.3)

The invention has for an object to provide an improved wheel construction embodying a resilient tire, for use in casters for furniture, skates, toys, wagons, and other wheels and pulleys, and such other uses as it may be found adaptable to.

It is an important aim of the invention to present such a wheel adaptable for use in situations where no wheel is at present available having the advantages of quietness when travelling upon floors of various materials, and avoiding abrasion of floor surfaces as well as preventing tendency to skid, especially when used upon skates.

A further important aim of the invention is to enable the embodiment of such a wheel in a size and form such that it will be interchangeable with conventional wheels heretofore used in skates and casters. A specific aim is to provide a novel construction for the attainment of non-skid function and qualities. Another specific aim of the invention is to present a novel construction and coordinate in arrangement and size of a tire and wheel member.

A further important aim of the invention is to present a novel construction in wheels suitable for use with resilient tires. A still further aim is to present a novel means for limiting the nature of displacement of material within the body of the tire, due to travel under load upon floor surfaces and the like.

Additional objects, advantages and features of invention reside in the construction, arrangement and combination of parts involved in the embodiment of the invention, as will be understood from the following description and accompanying drawing, wherein—

Figure 1 is a side view of a wheel embodying my invention.

Figure 2 is a sectional view thereof, taken in the medial plane of the wheel.

Figure 3 is a cross section of the wheel and tire assembled.

Figure 4 is a cross section of the tire alone.

Figure 5 is a longitudinal section of the hub element of the wheel.

There is illustrated a wheel 10, formed of two opposed discs 11 of pressed sheet metal, molded to identical form. Each disc includes an outer channeled wall portion 12 curved over 90 degrees in a circle having its center in the medial plane of the wheel between the discs and the curved parts stopping outwardly at the radius of such circle which is at an angle of approximately 30 degrees to a radius normal to the plane of the wheel. At the inner side of the channel 12, the plate is extended inwardly a short distance, as at 13, forming a shoulder, in a plane parallel to said medial plane, and formed with a concentric series of slots 14. Immediately inwardly of this slotted planiform portion or shoulder 13, the disc is dished, as at 15, strengthening the disc and placing its inner portion closer to the medial plane of the wheel, as may be seen. This dished portion is axially apertured, as at 16, or otherwise, as may be found desirable, to receive any usual bushing, skein, or other element (not illustrated) for engagement upon an axle or pin, or the wheels may be directly engaged upon such support axle, if desired. Secured between the two discs there is a hub 17, consisting of an annular, thin metal barrel member shaped to present a channel portion 18 therearound. The hub is provided with a lateral cylindrical flange portion 19 at each side, set against the planiform shoulder portion 13, before described, of the wheel disc, and tongues 20 projected integrally from the flange 19 are engaged through respective openings 14 in the wheel disc, and upset as shown in Figures 1 and 3. The channel portion 18 is transversely curved as a sector of a circle having the same center as the portions 12 of the discs. A multiplicity of apertures 21 are formed through the hub centrally of the channel 18, for a purpose to be subsequently disclosed. A resilient tire 22 is shown set between the discs and resting upon the hub, this tire being substantially circular in cross section, so as to conform to the curvature of the parts 12 and channel 18, as shown. The outer portions of the discs or rims 12 stop short of each other a distance at respective radii from the center of the transverse curve defining the parts 12 and 13, approximately at an angle of 90 degrees, and the tire 22 is formed with a tread extension 23, extended a short distance outwardly through the openings thus formed and having a cylindrical tread surface 24, forming the termination of this extension. The sides 25 of the extension 23 are planiform and parallel. The tire 22 is also formed with a multiplicity of knobs or lugs 27 engaged in respective openings 21 of the hub, whereby the tire is held against rotation on the hub.

The tire is formed with an annular chamber 28, which in cross section is substantially circular, but the center of this circle is offset outwardly from the center of the circle defining the transverse contour of the external surface of the tire, so that the wall of the chamber is quite thick at the base of the tire, and is tapered toward the outer portion, its minimum thickness occurring at the junction of the incurved sides of the tires with the extension 25. The wall portions at the sides of the tire are extended outwardly in planiform parallel relation to form the sides of the extension 23, these extensions of the walls being equal in thickness to the inwardly curved portions of the wall of the chamber 28 joined to the extension. Also, the tread portion 29, of which the tread surface 24 is formed, is formed with adequate thickness to compare with one of the side walls of the extension, although this may be varied, as experience may indicate. Formed on the tread portion 29 at the inner side, there are continuous parallel ribs 30 substantially thicker than the tread portion 29 and serving as stiffening members to prevent undue flexing of the tread portion 29 by pressures within the tire due to loads carried thereby.

The tire is intended to function as a cushion tire, and it is contemplated to introduce into the tire a non-compressible liquid or semi-liquid, which may be introduced through a needle in the familiar way, or by other means conforming to prior practice for introducing fluid, liquid or gases into a tubular container of this type.

The wheel, including the assembled tire thereon, may be made in various sizes suited to the uses contemplated and various modifications in construction and proportion of the parts, including substitution and other modifications, may be made within the spirit of the invention, as more particularly set forth in the appended claims.

In the use of the invention, especially when embodied as a rink skate wheel, the wheel may be substituted for the ordinary wheels upon rink skates, and used upon wooden floors without requiring the use of resin to prevent slipping. The wheel will eliminate noise such as has heretofore been produced by skates when used on many surfaces, where the rollers have been made of hard rubber or other hard compositions, and the invention has the advantage over the use of a simple, soft rubber cushion tire on skate wheels that, when rolling upon a floor surface or the like under load, the compression of the interior material of the tire next to the floor surface does not cause an extrusion of the material of the tire in the direction of progression and adjacent the floor surface, more or less in the form of a "lump" or "wrinkle," an objection and difficulty well recognized in the tire art and encountered to a certain extent in pneumatic tires, as well. In addition, owing to the formation of the ribs 30 extending around the tread portion of the tire therewithin, these ribs afford a greater amount of support when the tire is under load, the thin portions of the tread 29 between the ribs, and between the ribs and the side walls 25 of the tread extension yield more readily than the rib, thereby forming lands of high and low compression of the tread surface at the floor surface, the effect of which is to counteract tendency of the tire to skid under lateral stresses exerted through the load. By reason of the action of the liquid in the tire, in communicating hydrostatic pressure therein to the tire uniformly throughout its circumference, and the resistance of the tire to rise of pressure in the liquid, the tire is flattened in a minimum degree at the lower side, when under load and engaged with a floor surface. This function has an important advantage in minimizing the dissipation of energy by rolling of the tire upon the floor surfaces, such as would occur in tires where a "lump" or "wrinkle" is formed more pronouncedly in the tire immediately in advance of the point of contact with the supporting surface.

Much difficulty and considerable opposition to the establishment of skating rinks has been encountered by promoters heretofore on account of the great amount of noise produced by a multitude of skaters, either upon concrete, or composition, or wooden floors. The noise has been so objectionable to skaters that it is a practice to provide very loud music to subordinate the sounds produced by the skates, and this loud music added to the rest of the noise has made skating rinks highly objectionable in many situations, so that they have to be established in outlying or industrial areas, where access of the public is less convenient and agreeable.

The use of skates equipped with wheels as described will remedy these objections to such extent that skating may be permitted upon dance floors without liability of injury thereto, and without requiring such floors to be treated with resin, in order to prevent skidding. In addition, my wheels will minimize wear upon the floor surfaces so that they may be maintained in good condition, and dance hall floors used alternatively as rink floors or dance floors.

Various expedients recognized in the construction of vehicle tires may be used for strengthening the materials in my tire, for which reason reinforcement of fabric or other materials which may be readily employed therein are not illustrated.

It will be recognized that the tire comprises a substantial part of the wheel body, and while in the present instance the diameter of the tire approximately equals one-third the diameter of the entire wheel, by making the hub of small radius, the same size tire may be embodied in wheels of smaller diameter than that illustrated.

I claim:

1. A wheel of the character described comprising rigid side members and having at their outer parts tire-receiving portions transversely curved to form an annular space within which a tire of generally circular cross section may be enclosed for a major portion of its transverse circumference, a chambered tire snugly fitted therein and having a tread extension extended radially outward between the opposed side members, said tread extension being formed with thin walls including a transverse tread wall, a plurality of thick ribs formed on the inner side of the said tread wall parallel to the sides of the tread portion, and a non-compressible fluid entirely filling the space within the chambered portion of the tire.

2. The structure of claim 1, in which said chamber is a single chamber of generally circular cross section and located on a center nearer the tread portion than the center of the transverse contour of the exterior of the tire.

3. A tire having a single chamber of generally circular cross section and located on a center nearer the tread portion than the center of the transverse contour of the exterior of the tire, said tread portion being formed with thin walls including a transverse tread wall, a plurality of thick ribs formed on the inner side of said tread wall parallel to the sides of the tread portion, and a non-compressible fluid entirely filling the space within the chamber of the tire.

ROBLEY DUNGLISON BALLARD.